Figure 1:
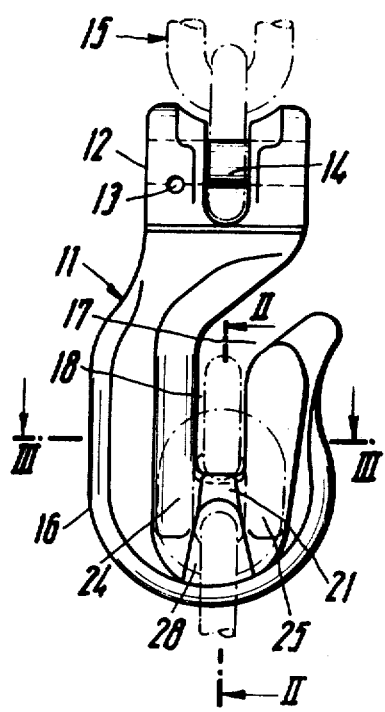

ns Patent [19] [11] 3,863,441
Kaufmann [45] Feb. 4, 1975

[54] SHORTENING HOOK

[76] Inventor: Hans Kaufmann, 7084 Unterkochen, Glashutte, Germany

[22] Filed: June 21, 1973

[21] Appl. No.: 372,226

[30] Foreign Application Priority Data
June 23, 1972 Germany............................ 2231653

[52] U.S. Cl.................................. 59/93, 294/82 R
[51] Int. Cl........................................... F16g 17/00
[58] Field of Search................. 59/93; 294/82 R, 78

[56] References Cited
UNITED STATES PATENTS
3,673,646 7/1972 Svensson........................... 294/82 R
3,741,599 6/1973 Drayton............................ 294/82 R Primary Examiner—C. W. Lanham
Assistant Examiner—Gene P. Crosby
Attorney, Agent, or Firm—Smythe & Moore

[57] ABSTRACT

A chain link hook with an angularly disposed mouth for receiving a chain link of a plurality of connected links, the hook having a groove supporting substantially the whole length of the bottom portion of the inserted link, said hook also having guide troughs for the connected links on each side of the inserted link.

6 Claims, 3 Drawing Figures

SHORTENING HOOK

The present invention relaes relates to a hook for round-chains which has an insertion slot which is formed by lateral supporting surfaces to prevent the tipping of the chain link introduced therein and wherein in the vicinity of its bottom there is a transverse yoke with projections which extend between the arms of the chain links following the chain link inserted into the shortening hook.

Shortening hooks of this type are known in which the bottom of the insertion slot supports the longitudinal arm of the suspended chain link over only an extremely short distance. The result is that the supported longitudinal leg of the inserted chain link is strongly stressed in flexure and becomes deformed when heavy loads develop.

One of the objects of the present invention is to overcome such an aforementioned disadvantage and to provide a shortening hook of the aforementioned type which is so developed that deformation of lengthwise legs of chain links inserted in it is definitely avoided and which furthermore assures the desired interlocking between the inserted chain link and the shortening hook.

The foregoing object is achieved in accordance with the invention in the manner that the transverse yoke is developed as a supporting yoke for the inserted chain link and supports the lengthwise leg of said chain link which faces the bottom of the insertion slot practically over its entire length.

Due to the fact that with the shortening hook of this invention, projections of the transverse yoke are also used to support the chain link inserted therein, the supported leg is protected from being bent. The stress conditions prevailing in the supported chain link are in this connection far more favorable than is known from the previously customary solutions.

It is particularly advantageous if the supporting yoke forms a centering trough for the inserted chain link. The centering trough not only provides assurance of a snug seat in the bottom of the insertion slot on the part of the chain link introduced into the shortening hook, but it also promotes the desired interlocking effect between the shortening hook and the section of the chain inserted in said hook. In addition, it becomes possible to support the chain link not merely in the vicinity of its logitudinal leg, but also in the vicinity of a part of the link arches.

A good interlocking of the inserted chain link is furthermore promoted by the fact that the shortening hook is provided in the vicinity of the ends of the supporting yoke with guide troughs for the chain links connected to the inserted chain link and the chain links following same. By the provision of a guide trough for the chain links following the chain links connected to the inserted chain link, the former chain links lie free and the arches of the links do press against the lower part of the shortening hook.

In one embodiment which affords a particularly high degree of assurance against unintentional removal of the chain link introduced into the shortening hook, the insertion slot has a mouth part which extends obliquely to the longitudinal axis of the hook and a guide part, extending in the longitudinal direction of the hook, for the inserted chain link, and the vertex line of the guide troughs for the chain links following the chain links connected to the attached chain link lie in the same plane in which the lengthwise legs of the inserted chain link are also held by the guide part.

Figure 2:
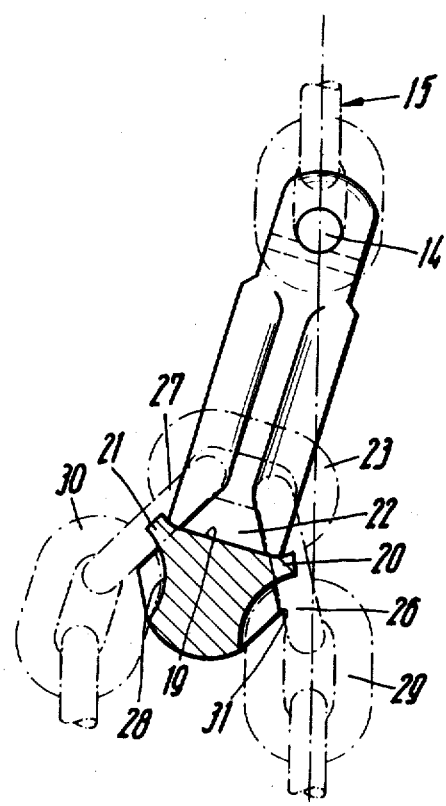
Figure 3:
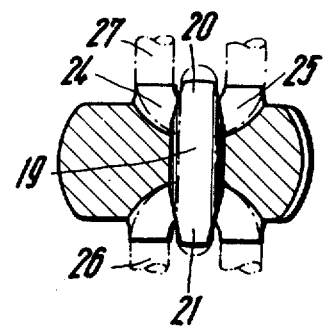

One embodiment of the shortening hook in accordance with the invention is shown in the accompanying drawing in which:

FIG. 1 is a side view of a shortening hook;
FIG. 2 is a section along the line II—II of FIG. 1; and
FIG. 3 is a section along the line III—III of FIG. 1.

The shortening hook designated generally as 11 in the figures has a head part 12 with a holding pin 14, locked by a lock pin 13, and intended for the attachment of the end link of a chain 15. Adjoining the head part 12 is the actual hook 16. It has an insertion slot which is formed of a mouth part 17 and a guide part 18. In the bottom of the hook, there is provided a supporting yoke 19 whose ends 20 and 21 protrude laterally beyond the main part of the hook. The lengthwise leg 22 of the chain link 23 introduced into the insertion slot 17, 18 rests on the supporting yoke 19. As can be noted in particular from FIG. 2, the side of the supporting yoke facing the lengthwise leg 22 forms a centering trough which practically prevents lateral backward and forward movements of the chain link 23. In the region of the ends of the supporting yoke, the shortening hook is provided with guide troughs 24 and 25 for the chain links 26 and 27 following the inserted chain link 23 and with a guide trough 28 for the chain links 29 and 30 adjoining the chain links 26 and 27. As can be noted in particular from FIG. 1, the vertex line of the guide troughs 28 lies in the sme plane in which the longitudinal leg of the chain link 23 is also held by the guide part 18 of the insertion slot.

By use of a bent or angled insertion slot, not only is there obtained greater assurance of the interlocking of the chain link 23 inserted for purposes of shortening into the insertion slot, but also such prevents the shortening hook being misused, i.e., by, for instance, inserting metal plates into the insertion slot. The arrangement of the supporting yoke 19 and of the guide troughs 24, 25, and 28 is of such a nature that the chain links 23 as well as 26 and 27 are provided with a good support in the shortening hook and that the chain link 29 which is under tension can move freely in the arch of the chain link 26 associated with it. As can be noted in particular from FIG. 2, the chain link 26 rests in the troughs 24 and 25 up to the point 31.

Both the chain link 22 and the chain link 26 are thus secured against undesired deformation.

What is claimed is:

1. A shortening hook for round link chains having a plurality of connected links, said hook having an insertion slot formed by lateral supporting surfaces extending essentially parallel to each other to prevent tilting of an inserted chain link therein, said hook including a transverse yoke arranged in the region of the bottom of the hook slot and having projections which extend between the legs of the chain links following the chain link introduced into the shortening hook, the transverse yoke being developed as a supporting yoke and a centering trough providing a snug seat in the bottom of said slot for the inserted chain link and supporting the longitudinal leg of said link which faces the bottom of the insertion slot over practically its entire length.

2. A shortening hook according to claim 1, characterized by the fact that in the region of the ends of the supporting yoke, there are guide troughs for the chain links connected with the inserted chain link and for the chain links following said links connected to said inserted link.

3. A shortening hook according to claim 1, characterized by the fact that in the region of the ends of the supporting yoke, there are guide troughs for the chain links connected with the inserted chain link and for the chain links following said links connected to said inserted link.

4. A shortening hook according to claim 3, characterized by the fact that the insertion slot has a mouth part extending obliquely to the longitudinal axis of the hook and a guide part for the inserted chain link extending in the longitudinal direction of the hook, and that the vertex line of the guide troughs for the chain links following the chain links next to the inserted link lie in the same plane as that in which the longitudinal legs of the inserted chain link are also held by the guide part.

5. A shortening hook according to claim 1, characterized in that it is formed near the projections of the supporting yoke with locating concavities which support the next links directly following the link inserted in the hook slot, as well as the next links after that.

6. A shortening hook according to claim 5 characterized in that the slot of the hook comprises an entry portion which is inclined to the longitudinal axis of the hook, the line of symmetry of the locating concavities for the links following the links which are directly attached to the link in the slot being contained in the same plane which also contains the sides of the link held in the slot.

* * * * *